United States Patent Office 3,084,201
Patented Apr. 2, 1963

3,084,201
TRINITROALKYL ETHERS AND PROCESS
Paul F. Hartman, Clifton, N.J., assignor to United States Rubber Company, New York, N.Y., a corporation of New Jersey
No Drawing. Filed July 14, 1950, Ser. No. 173,962
8 Claims. (Cl. 260—611)

This invention relates to a new process of making trinitroalkyl ethers from trinitromethane, alcohols and aldehydes and to certain new compounds produced thereby.

These ethers are potentially useful as explosives, propellants and propellant plasticizers.

The copending application of Pliny O. Tawney, Ser. No. 173,961, filed of even date herewith, describes a new class of chemicals, namely the trinitroalkyl ethers having the formula $$R-CH_2-CH-O-R'$$
$$\quad\quad\quad\;\;|$$
$$\quad\quad\;\;C(NO_2)_3$$

where R is hydrogen or alkyl and R' is alkyl, alkenyl, alkoxyalkyl, carbalkoxyalkyl, or aryl, and a method of making the same, which comprises reacting an ether having the structure R—CH=CH—O—R' with trinitromethane. However this method is somewhat limited in the variety of compounds that can be produced economically by it because of the relatively small number of such ethers which are available commercially at low cost.

I have now discovered a method of making trinitroalkyl ethers which lends itself to a much wider variety of compounds since it can utilize many commercially available and inexpensive reagents.

The present invention is based upon my discovery that trinitroalkyl ethers having the formula

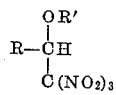

where R is alkyl, benzyl, thienyl, furyl or phenyl, and R' is alkyl, lower alkenyl, lower alkoxyalkyl or lower carbalkoxyalkyl can be made by reacting a monohydric alcohol R'OH, a monoaldehyde RCHO, and trinitromethane. This was completely unexpected because it was anticipated that the alcohol would function merely as an inert diluent in the expected reaction between the trinitromethane and the aldehyde, it being known in the art that trinitromethane and formaldehyde react to form 2,2,2-trinitroethanol. The present invention is further unique in that formaldehyde is inoperable in my invention.

Moreover I have discovered a new class of chemicals, namely the trinitroalkyl ethers wherein a trinitromethyl group is connected to a tertiary carbon atom which is connected by separate linkages to a hydrogen atom, to the ether oxygen atom and to a ring which is devoid of hydrogen on the ring carbon atom connected to the said tertiary carbon atom; i.e., compounds having the formula

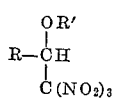

where R is phenyl, furyl or thienyl and R' is alkyl, lower alkenyl, lower alkoxyalkyl or lower carbalkoxyalkyl.

The reaction is as follows:

1.
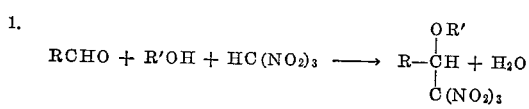

The reaction is believed to take place in two steps as follows:

2.
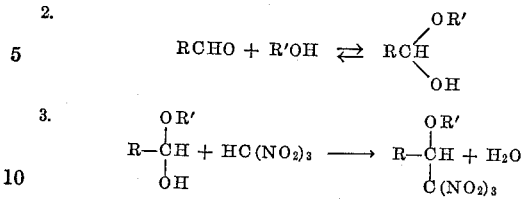

3.
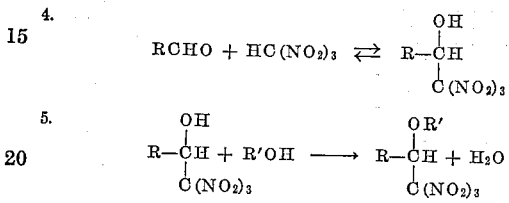

However, it may also proceed in the following less likely manner:

4.
$$RCHO + HC(NO_2)_3 \rightleftarrows R-\underset{\underset{C(NO_2)_3}{|}}{\overset{\overset{OH}{|}}{C}}H$$

5.
$$R-\underset{\underset{C(NO_2)_3}{|}}{\overset{\overset{OH}{|}}{C}}H + R'OH \longrightarrow R-\underset{\underset{C(NO_2)_3}{|}}{\overset{\overset{OR'}{|}}{C}}H + H_2O$$

In either event the end products are the same.

The process is carried out in general by mixing preferably equivalent amounts of the aldehyde and trinitromethane with excess of the alcohol, the excess acting as solvent. There often is a slight evolution of heat on mixing the reagents. The mixture is then kept at room temperature or any higher temperature up to the lower of either 100° C. or the boiling point of the solution at atmospheric pressure for a sufficient length of time to complete the reaction. At room temperature the reaction usually requires several hours, whereas it often may be completed within a few minutes at temperatures of 60–100° C. The product is then distilled in vacuo.

Alternately, the three reagents may be mixed preferably in equivalent amounts, in the presence of an inert solvent such as carbon tetrachloride, chloroform or tetrahydrofurane. This variant of the process is used primarily when the alcohol is high boiling or expensive. When this variant is employed, the reaction is conducted in the same manner as that set forth in the preceding paragraph.

The aldehyde is used as such or in the form of a material from which it is generated in situ; e.g., paraldehyde may be used instead of acetaldehyde. It was surprising to find that a polymer of the aldehyde would be decomposed under the reaction conditions and thus generate the aldehyde in situ. It is postulated that the trinitromethane acts as an acid and catalyzes the decomposition. This method of procedure is highly advantageous in that it obviates the necessity of treating the aldehyde polymer in a separate zone to decompose it and form the monomeric aldehyde. For example, paraldehyde boils at 124° C. and is conveniently handled while acetaldehyde is an extremely volatile liquid boiling at 20° C. and therefore difficult to handle and to introduce to a reaction zone at an elevated temperature.

The following example illustrates the process. All parts are by weight except as noted.

EXAMPLE

A mixture of 16.7 parts (0.11 mol) trinitromethane, 6.5 parts (0.11 mol) propionaldehyde and 35 parts (by volume) n-propanol is heated at 60° C. (reflux temperature) for an hour and then distilled in vacuo to give 26.7 parts or 97% yield, of n-propyl 1-ethyl-2,2,2-trinitroethyl ether, a water white liquid boiling at 73° C. at 0.8 mm. pressure of Hg $n_D^{20}$ 1.4428.

*Analysis.*—Calcd. for $C_7H_{13}O_7N_3$: nitrogen, 16.73%. Found: nitrogen, 16.88%.

This compound may be made equally well at room temperature if the mixture is allowed to stand for several hours before distilling.

Physical properties of typical trinitroalkyl ethers made by the process of the foregoing example are shown in Table 1. The yields are essentially quantitative in every case, but the percentage conversion varies widely. There appear to be no byproducts in this reaction. The unconverted reagents are quantitatively recovered.

*Table 1*

PROPERTIES OF 2,2,2-TRINITROETHYL ETHERS MADE FROM NITROFORM, ALCOHOLS AND ALDEHYDES

| Aldehyde | 2,2,2-Trinitroethyl ether [b] | Conversion, percent | Boiling point | $n_D^{20}$ |
|---|---|---|---|---|
| Acetaldehyde [a] | Methyl 1-methyl-ethyl | 33.5 | 59° C. @ 1.5 mm | [c] 1.4420 |
| Do.[a] | n-Propyl 1-methyl-ethyl | 65 | 68–69° @ 0.7 | 1.4395 |
| Do.[a] | Allyl 1-methyl-ethyl | 22 | 66° @ 0.8 | 1.4530 |
| Do.[a] | n-Bytul 1-methyl-ethyl | 60 | 76° @ 1.0 | 1.4410 |
| Do.[a] | β-Methoxyethyl 1-methyl-ethyl | 47 | 74.0–74.5° @ 0.4 | 1.4460 |
| Do.[a] | β-Acetoxyethyl 1-methyl-ethyl | 5 | 112–114° @ 0.5 | |
| Do.[a] | β-Ethylhexyl 1-methyl-ethyl | 75 | 99.5–101° @ 0.3 | 1.4467 |
| Do.[a] | n-Dodecyl 1-methyl-ethyl | 77 | 123° @ 0.4 | 1.4478 |
| Propionaldehyde | Methyl 1-ethyl-ethyl | 30 | 71° @ 1.9 | [d] 1.4450 |
| Do | n-Propyl 1-ethyl-ethyl | 97 | 73° @ 0.8 | 1.4428 |
| Do | Isopropyl 1-ethyl-ethyl | 26 | 65–66° @ 1.2 | 1.4440 |
| n-Butyraldehyde | Methyl 1-propyl-ethyl | 32 | 75° @ 1.8 | 1.4466 |
| Benzaldehyde | Methyl 1-phenyl-ethyl | 65 | M.P. 83–84° | |

[a] Paraldehyde may be used equally well.
[b] Made in each case from the alcohol corresponding to the first radical shown in the product; e.g. methanol n-propanol, allyl alcohol, n-butanol, etc.
[c] $d^{30}$ 1.3320. This compound is identical with that made from nitroform and methyl vinyl ether as disclosed in the above-identified application of P. O. Tawney, thus proving the structure of the compound.
[d] $d^{30}$ 1.2608.

Some of the alcohols which can be used in this process of making trinitroalkyl ethers are methanol, ethanol, n-propanol, isopropanol, the butanols, the pentanols, n-hexanol, n-heptanol, n-octanol, 2-ethylhexanol, n-decanol, n-dodecanol, n-tetradecanol, n-hexadecanol, n-octadecanol, oleyl alcohol, allyl alcohol, 2-methoxyethanol, 2-ethoxyethanol, 2-n-butoxyethanol, 2-carbomethoxyethanol, 2-carbethoxyethanol, furfuryl alcohol, tetrahydrofurfuryl alcohol, benzyl alcohol, cyclohexanol, etc.

Some of the aldehydes which can be used with trinitromethane and any of the above mentioned alcohols in this process of making trinitroalkyl ethers, are acetaldehyde, propionaldehyde, n-butyraldehyde, isobutyraldehyde, 2-ethylhexaldehyde, n-heptaldehyde, benzaldehyde, furfural, 2-thienyl aldehyde, phenylacetaldehyde, etc.

I claim:
1. The method of making a trinitroalkyl ether having the structural formula

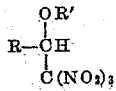

where R is selected from the group consisting of alkyl, benzyl, thienyl, furyl and phenyl and R' is selected from the group consisting of alkyl, lower alkenyl, lower alkoxyalkyl and lower carbalkoxyalkyl which comprises reacting a monohydric alcohol, R'OH, a monoaldehyde, RCHO, and trinitromethane.

2. The method of claim 1 wherein the reaction is carried out in the presence of an excess of the said alcohol, the excess serving as solvent.

3. The method of claim 1 wherein substantially equivalent amounts of said monoaldehyde and trinitromethane are employed and wherein an excess of said alcohol is employed, the excess serving as solvent.

4. The method of claim 1 wherein the reaction is carried out from room temperature up to the lower of 100° C. and the boiling point of the reaction mixture.

5. The method of claim 1 wherein the reaction is carried out by refluxing the mixture of the reactants.

6. The method of claim 1 wherein the reaction is carried out in the presence of an inert solvent.

7. The method of claim 1 wherein substantially equivalent amounts of said alcohol, monoaldehyde and trinitromethane are employed and wherein the reaction is carried out in the presence of an inert solvent.

8. Methyl 2,2,2-trinitro-1-phenyl-ethyl ether.

No references cited.